United States Patent
Jang

(10) Patent No.: US 9,729,856 B2
(45) Date of Patent: *Aug. 8, 2017

(54) METHOD AND SYSTEM FOR RELIABLE 3D SHAPE EXTRACTION OF METAL SURFACE

(71) Applicant: DONGGUK UNIVERSITY GYEONGJU CAMPUS INDUSTRY-ACADEMY COOPERATION FOUNDATION, Gyeongju-si, Gyeongsangbuk-do (KR)

(72) Inventor: Yu Jin Jang, Gyeongju-si (KR)

(73) Assignee: Dongguk University Gyeongju Campus Industry-Academy Cooperation Foundation (KR)

( * ) Notice: Subject to any disclaimer, the term of this patent is extended or adjusted under 35 U.S.C. 154(b) by 262 days.

This patent is subject to a terminal disclaimer.

(21) Appl. No.: 14/108,743

(22) Filed: Dec. 17, 2013

(65) Prior Publication Data

US 2014/0168382 A1 Jun. 19, 2014

Related U.S. Application Data

(63) Continuation of application No. PCT/KR2011/004559, filed on Jun. 22, 2011.

(30) Foreign Application Priority Data

Jun. 22, 2011 (KR) .................. 10-2011-0060594

(51) Int. Cl.
*H04N 13/02* (2006.01)
*G01B 11/245* (2006.01)
*G01B 11/25* (2006.01)

(52) U.S. Cl.
CPC ....... *H04N 13/0239* (2013.01); *G01B 11/245* (2013.01); *G01B 11/2509* (2013.01); *H04N 13/0253* (2013.01)

(58) Field of Classification Search
CPC .............. G01B 11/245; G01B 11/2509; H04N 13/0239; H04N 13/0253
(Continued)

(56) References Cited

U.S. PATENT DOCUMENTS 5,121,137 A * 6/1992 Taki ........................ H04N 1/502
347/232
5,836,872 A * 11/1998 Kenet et al. .................. 600/306
(Continued)

FOREIGN PATENT DOCUMENTS

| | | |
|---|---|---|
| JP | 2011-2240 A | 1/2011 |
| KR | 10-2007-0115064 A | 12/2007 |
| KR | 10-0862637 B1 | 10/2008 |

OTHER PUBLICATIONS

International Search Report, PCT/KR2011/004559, WIPO, May 8, 2012.

*Primary Examiner* — Shan Elahi
(74) *Attorney, Agent, or Firm* — Park & Associates IP Law, P.C.

(57) ABSTRACT

The present invention relates to a method and system for reliable 3D shape extraction of a metal surface. In this method, images are acquired at the same time by simultaneously irradiating interference-free polarized lights to a metal object. A photometric stereo method is then applied based on the images except for images which make the extraction of a 3D shape of the metal object inaccurate.

7 Claims, 2 Drawing Sheets

(58) Field of Classification Search
USPC .......................................................... 348/47
See application file for complete search history.

(56) References Cited

U.S. PATENT DOCUMENTS

| | | | | |
|---|---|---|---|---|
| 5,990,996 | A * | 11/1999 | Sharp ............................ | 349/119 |
| 6,273,571 | B1 * | 8/2001 | Sharp et al. ................... | 353/122 |
| 6,497,540 | B1 * | 12/2002 | Shikata et al. ................. | 409/234 |
| 6,677,942 | B1 * | 1/2004 | Rushmeier ............... | G06T 17/20 |
| | | | | 345/420 |
| 7,609,860 | B2 * | 10/2009 | Lee et al. ....................... | 382/118 |
| 8,736,670 | B2 * | 5/2014 | Barbour ............. | H04N 13/0207 |
| | | | | 348/44 |
| 9,131,861 | B2 * | 9/2015 | Ince ........................ | A61B 1/042 |
| 2001/0046316 | A1 * | 11/2001 | Miyano et al. ................ | 382/154 |
| 2002/0171824 | A1 * | 11/2002 | Overbeck ................ | G01J 3/508 |
| | | | | 356/138 |
| 2003/0086603 | A1 * | 5/2003 | Davidson ................... | G06T 3/40 |
| | | | | 382/154 |
| 2003/0112507 | A1 * | 6/2003 | Divelbiss et al. ............. | 359/464 |
| 2004/0189957 | A1 * | 9/2004 | Shpizel .............. | H04N 13/0459 |
| | | | | 353/97 |
| 2006/0018025 | A1 * | 1/2006 | Sharon ................... | H04N 9/315 |
| | | | | 359/618 |
| 2006/0184037 | A1 * | 8/2006 | Ince ........................ | A61B 1/042 |
| | | | | 600/476 |
| 2006/0187547 | A1 * | 8/2006 | Fukuda ................. | G02B 5/3066 |
| | | | | 359/485.02 |
| 2006/0280343 | A1 * | 12/2006 | Lee et al. ....................... | 382/118 |
| 2007/0013978 | A1 * | 1/2007 | Watanabe ................. | G01J 3/02 |
| | | | | 358/504 |
| 2007/0206836 | A1 * | 9/2007 | Yoon ................... | G06K 9/00362 |
| | | | | 382/104 |
| 2008/0012850 | A1 * | 1/2008 | Keating, III ................... | 345/419 |
| 2008/0205052 | A1 * | 8/2008 | Hayes et al. ................... | 362/231 |
| 2009/0012378 | A1 * | 1/2009 | Ince ........................ | A61B 1/042 |
| | | | | 600/322 |
| 2009/0040532 | A1 * | 2/2009 | Kawasaki ........... | G01B 11/2513 |
| | | | | 356/610 |
| 2009/0303597 | A1 * | 12/2009 | Miyawaki .............. | G02B 27/22 |
| | | | | 359/559 |
| 2010/0046050 | A1 * | 2/2010 | Kroll et al. ..................... | 359/9 |
| 2010/0111370 | A1 * | 5/2010 | Black et al. ................... | 382/111 |
| 2010/0289878 | A1 * | 11/2010 | Sato ................... | H04N 13/0239 |
| | | | | 348/46 |
| 2010/0304854 | A1 * | 12/2010 | McEldowney ....... | G06K 9/2027 |
| | | | | 463/30 |
| 2010/0321704 | A1 * | 12/2010 | Kawai et al. .................. | 356/612 |
| 2011/0019203 | A1 * | 1/2011 | Taguchi ................... | G02B 5/32 |
| | | | | 356/614 |
| 2011/0069866 | A1 * | 3/2011 | Kim .................... | G06K 9/00369 |
| | | | | 382/103 |
| 2011/0262007 | A1 * | 10/2011 | Kojima ............ | G01B 11/2509 |
| | | | | 382/103 |
| 2012/0026085 | A1 * | 2/2012 | McEldowney ....... | G06K 9/2027 |
| | | | | 345/156 |
| 2012/0257018 | A1 * | 10/2012 | Shigemura ......... | G02B 27/2214 |
| | | | | 348/46 |

* cited by examiner

METHOD AND SYSTEM FOR RELIABLE 3D SHAPE EXTRACTION OF METAL SURFACE

REFERENCE TO RELATED APPLICATIONS

This is a continuation of pending International Patent Application PCT/KR2011/004559 filed on Jun. 22, 2011, which designates the United States and claims priority of Korean Patent Application No. 10-2011-0060594 filed on Jun. 22, 2011, the entire contents of which are incorporated herein by reference.

FIELD OF THE INVENTION

The present invention relates to a method and system for extracting a three-dimensional (3D) shape of a metal surface, and more particularly, to a method and system for extracting a 3D shape of a metal surface that may reliably extract a 3D shape of a surface of a metal object by simultaneously irradiating interference-free polarized lights to the metal object, and by applying, to a photometric stereo method, images that are free from an effect of direct reflected light, excluding an image that may make the extraction of the 3D shape inaccurate.

BACKGROUND OF THE INVENTION

The development of a technique about a system capable of reliably extracting a three-dimensional (3D) shape of a surface of a moving metal object in real time has been required. In particular, in the steel industry, great efforts have been made to improve the quality of final release products by finding a variety of surface defects associated with the final release products and by excluding a product from which a surface defect is found, and the development of a related technique has been consistently required.

A photometric stereo method refers to a method of extracting a 3D shape of an object using images acquired by sequentially irradiating minimum at least three lights to a target object using a single camera. According to an increase in a number of lights, the 3D shape of the target object may be more reliably extracted. Such an existing method of acquiring images by sequentially irradiating minimum at least three lights in different directions may not provide an image captured at the same viewpoint with respect to a moving object. Accordingly, the extraction of a 3D image may be difficult.

Currently, to solve the above issue, a method of extracting 3D shape information by simultaneously irradiating, to an object, lights of different three wavelengths, red (R), green (G), and blue (B) wavelengths, using a single RGB camera has been developed. In general, a metal surface refers to a non-Lambertian surface on which a direct reflected light is present in a predetermined direction when irradiating a light. When simultaneously irradiating three lights of three R, G, and B wavelengths to a metal object, a direct reflected light may be transferred to a camera based on a position of a corresponding light and a shape of a surface of the metal object to thereby saturate a sensor of the camera. It indicates that the extraction of a 3D shape of a target object is difficult or inaccurate.

Accordingly, there is a need for a method and system that may overcome the above issues and may reliably extract a 3D shape of a surface of a metal object.

SUMMARY OF THE INVENTION

The present invention provides a method and system for extracting a three-dimensional (3D) shape of a metal surface that may reliably extract a 3D shape of a surface of a metal object by simultaneously irradiating, to the metal object, 2n interference-free lights, generated by polarizing a light having n different wavelengths, and thereby acquiring 2n images, and by applying, to a photometric stereo method, minimum at least three images that are free from an effect of direct reflected light, excluding an image that may make the extraction of the 3D shape of the metal object inaccurate. Here, n denotes a natural number satisfying n≥3.

According to an aspect of the present invention, there is provided a method of extracting a three-dimensional (3D) shape, the method including: simultaneously irradiating, to a target object (a moving or stationary metal object), n polarized lights of n wavelengths and another n differently polarized lights of the same wavelengths as the n polarized lights, and acquiring 2n two-dimensional (2D) images corresponding to the 2n lights, n denoting a natural number satisfying n≥3; and extracting a 3D shape of a surface of the target object by synthesizing at least three images among the 2n 2D images.

The 3D shape of the 3D object may be extracted through a photometric stereo method using the at least three images, which are free from an effect of direct reflected light, excluding an image saturated by the direct reflected light from among the 2n 2D images.

The n polarized lights may include linearly polarized lights, and the other n differently polarized lights may include lights that are linearly polarized in a direction orthogonal to the n polarized lights. A circular polarizing filter may include two portions, that is, a linear polarizing filter portion and a quarter wave plate portion. When applying the circular polarizing filter to a light source, the circular polarizing filter may enable the light source to generate a linearly polarized light by making a light pass the linear polarizing filter portion. Accordingly, the linearly polarized light may be acquired by applying a linear polarizing filter or a circular polarizing filter to a light.

The 2n 2D images may be acquired using optical filters for transmitting lights of the wavelengths from two cameras each having a linear polarizing filter of transmitting a corresponding linearly polarized light.

Dissimilar to the aforementioned case, when applying the circular polarizing filter to a camera, a light that is irradiated to and thereby reflected from the metal object may initially pass the linear polarizing filter portion of the circular polarizing filter and then pass the quarter wave plate portion. Accordingly, the intensity of circularly polarized light may be sensed at an image sensor, for example, a complementary metal-oxide semiconductor (CMOS) sensor and a charged couple device (CCD), of the camera. That is, in view of acquiring an image from the camera, the same effect may be achieved both in a case of applying the linear polarizing filter to the camera and in a case of applying the circular polarizing filter to the camera.

Accordingly, the 2n 2D images may be acquired using optical filters for transmitting the lights of the wavelengths from two cameras of which linear polarizing filter portions of circular polarizing filters are disposed to be orthogonal to each other, and may also be acquired using a camera in which the linear polarizing filter and the circular polarizing filter are combined.

According to another aspect of the present invention, there is provided a system for extracting a 3D shape, the system including: 2n light sources for n polarized lights of n wavelengths and another n differently polarized lights of the same wavelengths as the n polarized lights, n denoting a natural number satisfying n≥3; a camera system configured to acquire 2n 2D images corresponding to lights of the 2n light sources; and an image processing means configured to extract a 3D shape of a surface of a target object by synthesizing at least three images among the 2n 2D images when the 2n 2D images are acquired by the camera system by simultaneously irradiating the lights of the 2n light sources to the target object.

The n polarized lights may include linearly polarized lights, and the other n differently polarized lights may include lights that are linearly polarized in a direction orthogonal to the n polarized lights. Here, the camera system may include two cameras each having a linear polarizing filter of transmitting a corresponding linearly polarized light, and the two cameras may be respectively provided with optical filters for transmitting lights of the wavelengths. Alternatively, the camera system may include two cameras of which linear polarizing filter portions of circular polarizing filters are disposed to be orthogonal to each other, and the two cameras may be respectively provided with optical filters for transmitting lights of the wavelengths. Alternatively, the camera system may include two cameras of which the linear polarizing filter and the linear polarizing filter portion of the circular polarizing filter are disposed to be orthogonal to each other, and the two cameras may be respectively provided with optical filters for transmitting lights of the wavelengths.

A method and system for extracting a three-dimensional (3D) shape of a metal surface according to embodiments of the present invention may improve the product quality and also significantly save costs by providing reliable information on a 3D shape of a surface of a moving or stationary metal object. In particular, in the steel industry, the method and system for extracting a 3D shape may make great contributions to managing the product quality by finding a variety of surface defects associated with final release products.

DETAILED DESCRIPTION OF THE INVENTION

Hereinafter, exemplary embodiments of the present invention are described with reference to the accompanying drawings and contents disclosed therein, however, the present invention is not limited thereto or restricted thereby.

To reliably extract a three-dimensional (3D) shape of a surface of a stationary or moving metal object using a photometric stereo method in real time, minimum at least three interference-free lights may need to be irradiated to the metal object and images corresponding to the respective lights may need to be simultaneously acquired. In general, when considering a visible light area and an infrared area, about seven different wavelengths may be selected from a light and a large amount of costs may be used to configure interference-free lights. Also, a large amount of costs may be additionally used to manufacture a camera capable of distinguishing selected seven wavelengths.

According to the present invention, a plurality of interference-free bright lights may be easily configured using a polarized light into consideration of the aforementioned aspect. Also, a camera system capable of acquiring an image may be easily configured by applying the same principle. Accordingly, a photometric stereo method using images that are free from an effect of direct reflected light may be easily applied.

Figure 1:
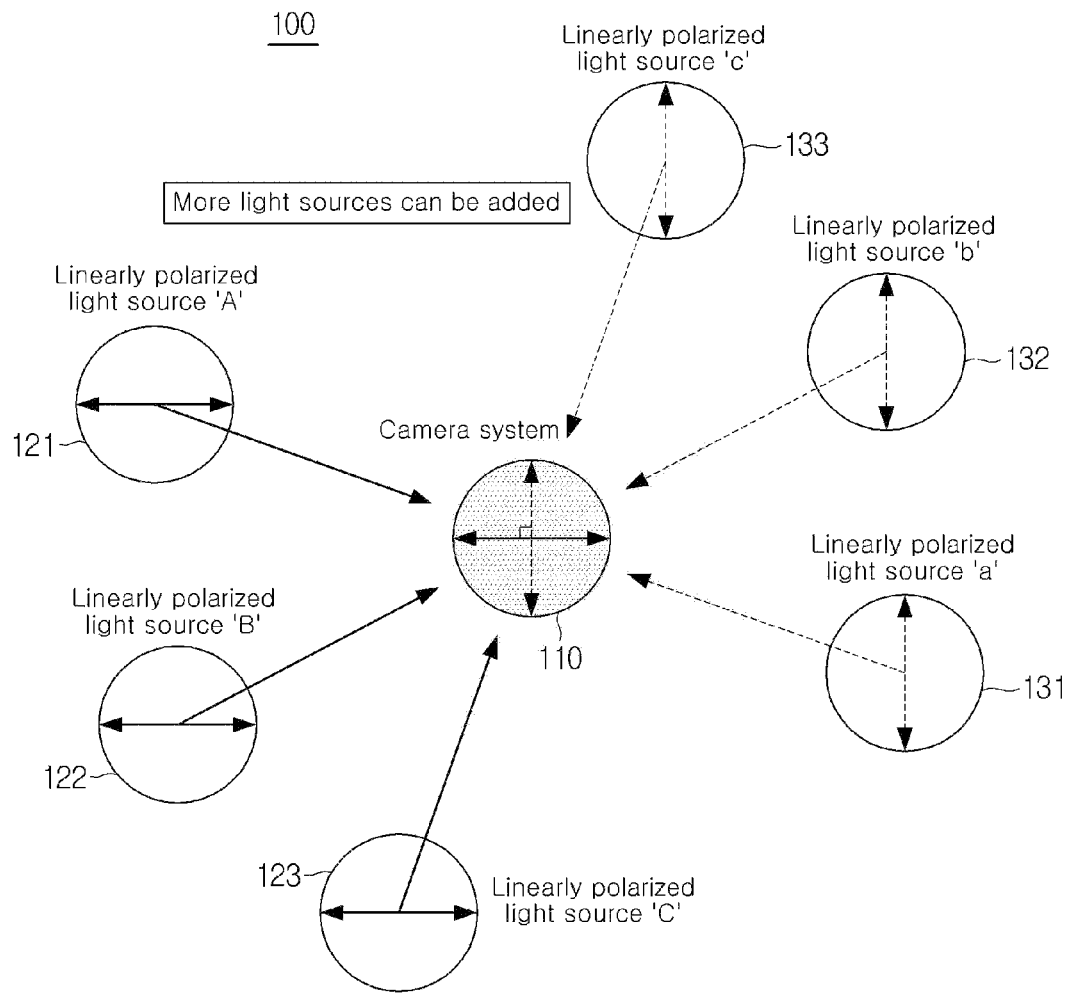
FIG. 1 is a diagram illustrating a system for extracting a three-dimensional (3D) shape of a metal surface according to an embodiment of the present invention.
Figure 2:
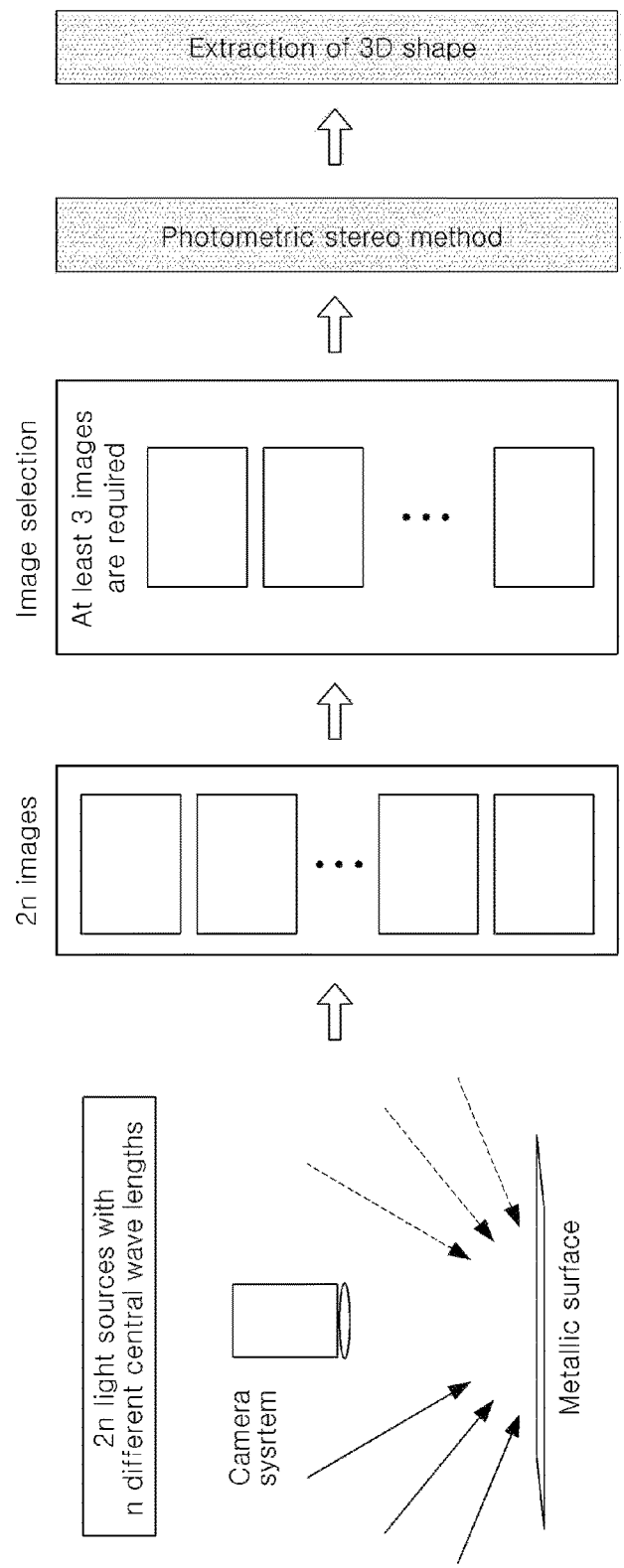
FIG. 2 is a diagram illustrating a process of extracting a reliable 3D shape of a metal surface using systems according to the present invention.

FIG. 1 is a diagram illustrating a system 100 for extracting a 3D shape of a metal surface according to an embodiment of the present invention.

Referring to FIG. 1, the system 100 for extracting a 3D shape of a metal surface according to an embodiment of the present invention includes a camera system 110 and a plurality of light sources 121, 121, 123, 131, 132, and 133.

The plurality of light sources 121, 122, 123, 131, 132, and 133 include three linearly polarized light sources 121, 122, and 123 for three lights of three wavelengths, and another three light sources 131, 132, and 133 that are linearly polarized in directions orthogonal to the light sources 121, 122, and 123, and of the same wavelengths as the light sources 121, 122, and 123.

The camera system 110 may acquire six two-dimensional (2D) images corresponding to lights of the plurality of light sources 121, 122, 123, 131, 132, and 133, when simultaneously irradiating the lights to the metal object from the plurality of light sources 121, 122, 123, 131, 132, and 133.

Referring to FIG. 1, a light 'A' of the light source 121 and a light 'a' of the light source 131 refer to lights of which central wavelengths are $\lambda 1$ and of which wavelengths are the same, a light 'B' of the light source 122 and a light source 'b' of the light source 132 refer to lights of which central wavelengths are $\lambda 2$ and of which wavelengths are the same, and a light 'C' of the light source 123 and a light 'c' of the light source 133 refer to lights of which central wavelengths are $\lambda 3$ and of which wavelengths are the same.

Here, for clarity of description, three light sources 121, 122, and 123 for lights of three wavelengths and the other three light sources 131, 132, and 133 for lights of the same wavelengths as the light sources 121, 122, and 123 in different directions, for example, orthogonal directions, however, the present invention is not limited thereto. At least three light sources for lights of at least three wavelengths may also be used. For example, light sources for simultaneously irradiating lights to the metal object may include 2n light sources for n polarized lights of n wavelengths and another n lights polarized in different directions, for example, orthogonal directions and of the same wavelengths as the n polarized lights. The camera system 110 may acquire 2n 2D images corresponding to lights of the 2n light sources. Here, n denotes a natural number satisfying $n \geq 3$.

Referring to FIG. 1, the light 'A' of the light source 121 and the light 'a' of the light source 131 refer to linearly polarized lights generated by making lights of the central wavelength $\lambda 1$ be mutually orthogonal, for example, horizontal/vertical, using a linear polarizing filter or a circular polarizing filter, and thus, are interfere-free lights that do not have interference with respect to each other. In the same manner, the light 'B' of the linearly polarized light source 122 and the light 'b' of the linearly polarized light source 132 may be configured to be mutually orthogonal, for example, horizontal/vertical, using lights of the central wavelength $\lambda 2$, and the light 'C' of the linearly polarized light source 123 and the light 'c' of the linearly polarized light source 133 may be configured to be mutually orthogonal, for example, horizontal/vertical, using lights of the central wavelength $\lambda 3$. For example, the circular polarizing filter may include two portions, that is, a linear polarizing filter portion and a quarter wave plate portion. When applying the circular polarizing filter to a light source, the circular polarizing filter may enable the light source to generate a finally linearly polarized light by making a light sequentially pass the quarter wave plate portion and the linear polarizing filter portion. Accordingly, each of the plurality of light sources 121, 122, 123, 131, 132, and 133 may generate a linearly polarized light of a corresponding wavelength using the linear polarizing filter, the circular polarizing filter, or a combination thereof.

Referring to FIG. 1, when simultaneously irradiating the linearly polarized lights of the plurality of light sources 121, 122, 123, 131, 132, and 133 to the metal object using corresponding linear polarizing filters or circular polarizing filters and using optical filters for transmitting lights of corresponding wavelengths, the camera system 110 may simultaneously acquire 2n 2D images having the same effects as effects achieved when sequentially irradiating the lights to the metal object. To achieve six light effects of FIG. 1, six 2D images may be simultaneously acquired using two RGB cameras configured to identify and thereby photograph three wavelengths, for example, R, G, and B wavelengths, of which linear polarizing filters are disposed to be orthogonal to each other, or using two RGB cameras of which linear polarizing filter portions of circular polarizing filters are disposed to be orthogonal to each other. Alternatively, it is possible to use two cameras of which a linear polarizing filter and a linear polarizing filter portion of a circular polarizing filter are disposed to be mutually orthogonal. For example, a first camera having the linear polarizing filter and a second camera having the circular polarizing filter may be used. Here, the circular polarizing filter to be provided to the camera may include two portions, that is, the linear polarizing filter portion and the quarter wave plate portion. The circular polarizing filter may acquire image data about corresponding 2D images by making a light sequentially pass the linear polarizing filter portion and the quarter wave plate portion and thereby sensing the intensity thereof using an image sensor, for example, a complementary metal-oxide semiconductor (CMOS) sensor and a charged couple device (CCD).

Using a system for extracting a 3D shape of a metal surface according to the present invention as described above, a 3D shape of a metal object may be extracted. To this end, the system for extracting a 3D shape of a metal surface according to the present invention may include an image processing means configured to extract a 3D shape of a corresponding metal object by synthesizing at least three images among 2n 2D images when the 2n 2D images are acquired by a camera system by simultaneously irradiating 2n interference-free lights to the metal object as illustrated in FIG. 1. The image processing means may be configured as hardware, software, or a combination thereof, and may also be configured as an exclusive processor or a computer.

The image processing means may reliably extract the 3D shape of the surface of the metal object by applying, to a photometric stereo method, minimum at least three images, which are free from an effect of direct reflected light, among the 2n 2D images acquired by the camera system. The image processing means may select minimum at least three images from among the 2n 2D images by applying a variety of criteria. For example, an image saturated by the reflected light may be included in images acquired by the image sensor of the camera system. The saturated image may be removed by the image processing means. The image processing means may extract the 3D shape of the corresponding metal object by selecting at least three images that are free from an effect of the direct reflected light and by synthesizing the selected at least three images using the photometric stereo method.

The photometric stereo method refers to a method of restoring a 3D shape of a target object by analyzing brightness values (or grey levels) of input images. Detailed contents may refer to descriptions disclosed in existing documents.

As described above, according to the present invention, a 3D shape of a surface of a metal object may be reliably extracted by simultaneously irradiating, to the metal object, 2n interference-free lights, generated by polarizing a light having n different wavelengths, and thereby acquiring 2n images, and by applying, to a photometric stereo method, minimum at least three images that are free from an effect of direct reflected light, excluding an image that may make the extraction of the 3D shape of the metal object inaccurate. Here, n denotes a natural number satisfying n≥3. Accordingly, it is possible to improve the product quality and also to significantly save costs by providing reliable information on a 3D shape of a surface of a stationary or moving metal object. In particular, in the steel industry, great contributions may be made to managing the product quality by finding a variety of surface defects associated with final release products.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of extracting a three-dimensional (3D) shape, the method of comprising:
    irradiating a target object simultaneously with a first set and a second set of polarized lights, each set comprising at least three polarized lights of a distinct wavelengths and the second set of polarized lights having at least three polarized lights of the same wavelengths as the first set of polarized lights, wherein the first set of polarized lights being polarized in a direction different from the second set of polarized lights;
    operating a processor to determine whether the target object is in a moving state or in a stationary state;
    acquiring two sets of two-dimensional (2D) images via two discrete cameras, each set of two-dimensional (2D) images from each one of the two discrete cameras comprising at least three two-dimensional (2D) images, in which each of the two-dimensional (2D) images is generated from the distinct polarized lights among the corresponding polarized lights of the first set and the second set of the polarized lights reflected on an outer surface of the target object;
    operating the processor to select at least three two-dimensional (2D) images among the two sets of two-dimensional (2D) images excluding two-dimensional (2D) images generated from direct reflected light; and
    operating the processor to synthesize said at least three of the selected two-dimensional (2D) images by a photometric stereo method.

2. The method of claim 1, wherein the first set of polarized lights are linearly polarized lights, and the second set of polarized lights are linearly polarized in a direction orthogonal to the first set of polarized lights.

3. A system for extracting a three-dimensional (3D) shape of a target object, the system comprising:
- a first light source emitting at least three polarized lights of distinct wavelengths on to an outer surface of the target object and a second light source emitting at least three polarized lights of the same wavelengths as the polarized lights of the first light source on to an outer surface of the target object, the first light source and the second light source emitting their polarized lights to the outer surface of the target object at the same time, wherein the polarized lights of the first light source being polarized in a different direction from the polarized lights of the second light source;
- two cameras;
- a processor; and
- a non-transitory memory storing a set of instructions executable by the processor, when executed:
- the processor activates the two cameras to acquire two-dimensional (2D) images, each two-dimensional (2D) image corresponding to a distinct polarized lights of the first light source and the second light source; and
- the processor selects at least three two-dimensional (2D) images among the two-dimensional (2D) images other than two-dimensional (2D) images obtained from direct reflected light, and synthesizes the selected three images by a photometric method to extract a 3D shape of the surface of the target object.

4. The system of claim 3, wherein the polarized lights of the first light source are linearly polarized, and wherein the polarized lights of the second light source are linearly polarized in a direction orthogonal to the polarized lights of the first light source.

5. The system of claim 3, wherein each of the two cameras is provided with a linear polarizing filter of transmitting a linearly polarized light in a corresponding direction.

6. The system of claim 3, wherein each of the two cameras is provided with a circular polarizing filter, wherein linear polarizing filter portions of the circular polarizing filters are arranged to be orthogonal to each other.

7. The system of claim 3, wherein a first camera of the two cameras is provided with a linear polarizing filter and a second camera of the two cameras is provided with a circular polarizing filter of which a linear polarizing filter portion of the circular polarizing filter is arranged to be orthogonal to the linear polarizing filter of the first camera.

* * * * *